US012675141B1

(12) United States Patent
Vandermeijden et al.

(10) Patent No.: US 12,675,141 B1
(45) Date of Patent: Jul. 7, 2026

(54) TOUCH SENSOR CLOSE DETECTION

(71) Applicant: Synaptics Incorporated, San Jose, CA (US)

(72) Inventors: Tom Vandermeijden, San Jose, CA (US); Samuel Toba, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 19/053,799

(22) Filed: Feb. 14, 2025

(51) Int. Cl.
*G06F 1/16* (2006.01)
*G06F 3/041* (2006.01)
*G06F 3/044* (2006.01)

(52) U.S. Cl.
CPC ........ *G06F 1/1677* (2013.01); *G06F 3/04162* (2019.05); *G06F 3/0446* (2019.05)

(58) Field of Classification Search
CPC ...... G06F 3/0446; G06F 3/0412; G06F 3/044; G06F 3/04166; G06F 3/0445; G06F 3/0416; G06F 3/04883; G06F 3/0488; G06F 3/041; G06F 3/0443; G06F 3/0418; G06F 3/04886; G06F 3/0482; G06F 3/03545; G06F 3/0448; G06F 3/047; G06F 3/03547; G06F 3/017; G06F 3/04817; G06F 3/016; G06F 3/04162; G06F 3/04184; G06F 3/0484; G06F 3/04186; G06F 3/04182; G06F 3/04164; G06F 2203/04108; G06F 2203/04104; G06F 2203/04103; G06F 2203/04808; G06F 2203/04105;

(Continued)

(56) References Cited

U.S. PATENT DOCUMENTS

| | | | |
|---|---|---|---|
| 7,428,142 B1 | 9/2008 | Ligtenberg et al. | |
| 8,773,146 B1 * | 7/2014 | Hills ...................... | G01N 27/22 345/173 |
| 9,904,412 B2 | 2/2018 | Stevenson et al. | |

(Continued)

FOREIGN PATENT DOCUMENTS

| | | |
|---|---|---|
| KR | 20010040410 A | 5/2001 |
| KR | 20170085317 A | 7/2017 |

OTHER PUBLICATIONS

International Search Report, dated May 28, 2026, in International Patent Application No. PCT/US2026/014838, filed Feb. 11, 2026.

*Primary Examiner* — Dong Hui Liang
(74) *Attorney, Agent, or Firm* — Leydig, Voit & Mayer, Ltd.

(57) ABSTRACT

Methods and systems for close detection are provided. An input device has an opened state and a closed state. The input device includes a first portion comprising a touch sensor having a sensing area. The touch sensor includes a plurality of transmitter electrodes and a plurality of receiver electrodes. The input device also has a second portion comprising a plurality of features. A sensor circuit is configured to drive the plurality of transmitter electrodes with sensing signals and receive resulting signals from the plurality of receiver electrodes. A processing system is configured to generate an acquired image from at least a portion of the sensing area; compare the acquired image to a reference image, wherein the reference image includes data corresponding to the plurality of features; and determine whether the input device is in the closed state based on the comparison of the acquired image to the reference image.

20 Claims, 8 Drawing Sheets

(58) Field of Classification Search
CPC . G06F 2203/04112; G06F 2203/04107; G06F
2203/04101
See application file for complete search history.

(56) References Cited

U.S. PATENT DOCUMENTS

| 10,712,862 | B1 | 7/2020 | Kang et al. | |
| 11,579,679 | B2 | 2/2023 | Pundak | |
| 2007/0075965 | A1 | 4/2007 | Huppi et al. | |
| 2009/0016003 | A1 | 1/2009 | Lightenberg et al. | |
| 2011/0197155 | A1 | 8/2011 | Lee et al. | |
| 2012/0194448 | A1 | 8/2012 | Rothkopf | |
| 2012/0229419 | A1 | 9/2012 | Schwarz et al. | |
| 2014/0380227 | A1 | 12/2014 | Ng et al. | |
| 2015/0091842 | A1 | 4/2015 | Shepelev et al. | |
| 2016/0187994 | A1 | 6/2016 | La et al. | |
| 2016/0282964 | A9 | 9/2016 | Kim et al. | |
| 2018/0088633 | A1 | 3/2018 | Whitman et al. | |
| 2018/0176347 | A1* | 6/2018 | Jeon .................... | H04M 1/0245 |
| 2021/0011520 | A1 | 1/2021 | Bhat et al. | |
| 2021/0132769 | A1 | 5/2021 | Parikh et al. | |
| 2022/0057889 | A1 | 2/2022 | Xiao et al. | |
| 2023/0315187 | A1 | 10/2023 | Vandermeijden et al. | |

* cited by examiner

TOUCH SENSOR CLOSE DETECTION

TECHNICAL FIELD

This disclosure generally relates to touch sensors and more particularly touch sensors that may be used to determine an opened or closed state of a device.

BACKGROUND

Input devices such as touch sensor devices (also commonly called touchpads, touch sensors, or proximity sensor devices), are used in a variety of electronic systems. Touch sensor devices typically include a sensing region, often demarked by a surface, in which the touch sensor device determines the presence, location and/or motion of one or more input objects, typically for purposes of allowing a user to provide user input to interact with the electronic system. The input device may be a touchscreen that includes a plurality of electrodes and is also capable of allowing the user to provide user input to interact with the electronic system. Touch sensors may be integrated with a display such as, for example, commonly found in mobile phones, laptop computers, desktop computers and similar devices.

It is useful to know when a device such as laptop or mobile device is in a closed position. Some devices use a hall sensor and magnet to detect a closed position. Another solution uses multiple sensor components, e.g., a transmitter in one part of the device, such as a keyboard portion, and receiver in another component, such as a touch sensor, or vice versa.

SUMMARY

In an exemplary embodiment, an input device having an opened state and a closed state is provided. The input device includes a first portion comprising a touch sensor having a sensing area. The touch sensor includes a plurality of transmitter electrodes and a plurality of receiver electrodes. The input device also has a second portion comprising a plurality of features. The input device further has a sensor circuit configured to drive the plurality of transmitter electrodes with sensing signals and receive resulting signals from the plurality of receiver electrodes. The input device further includes a processing system. The processing system is configured to generate an acquired image from at least a portion of the sensing area; compare the acquired image to a reference image, wherein the reference image includes data corresponding to the plurality of features; and determine whether the input device is in the closed state based on the comparison of the acquired image to the reference image.

In a further exemplary embodiment, a touch sensor is provided. The touch sensor includes a sensing area, a plurality of transmitter electrodes, a plurality of receiver electrodes, and a sensor circuit. The sensor circuit is configured to drive the plurality of transmitter electrodes with sensing signals and receive resulting signals from the plurality of receiver electrodes. The touch sensor also has a processing system configured to: generate an acquired image from at least a portion of the sensing area; compare the acquired image to a reference image, wherein the reference image includes data corresponding to a plurality of features proximate to the sensing area when a device associated with the touch sensor is in a closed state; and determine whether the device is in the closed state based on the comparison of the acquired image to the reference image.

In a yet a further exemplary embodiment, a method for determining when a device is in a closed state is provided. The method includes driving a plurality of transmitter electrodes of a touch sensor on a first portion of the device with sensing signals; receiving resulting signals from a plurality of receiver electrodes of the touch sensor on the first portion of the device; generating an acquired image from the touch sensor with the resulting signals; comparing the acquired image to a reference image, wherein the reference image includes data corresponding to a plurality of features of a second portion of the device proximate to the touch sensor when the device is in the closed state; and determining the input device is in the closed state based on the comparison of the acquired image to the reference image.

DESCRIPTION

The following detailed description is exemplary in nature and is not intended to limit the disclosure or the application and uses of the methods and systems described herein. Furthermore, there is no intention to be bound by any expressed or implied theory presented in the preceding technical field, background, summary and brief description of the drawings, or the following detailed description.

Exemplary systems and methods described herein provide for detecting a state (e.g., an orientation such as an opened state or closed state) of a closeable device such as, by way of example, a laptop, foldable phone, gaming device, and/or other types of devices. The device includes a touch sensor, which in certain embodiments may be a capacitive touch screen with integrated display. In certain embodiments, the touch sensor generates an image of a sensing area to determine whether the device is in an opened or closed position. Such determination is based on whether certain features are detected in the sensing area. In other embodiments, the touch sensor functions as a transmitter and receiver that detects whether the device is an open or closed state based on whether a transmitted signal is received. The systems and methods obviate the need for dedicated opened/closed sensors, such as an IR sensor or a hall sensor. It also eliminates the need for sensors on multiple portions (e.g., display portion and keyboard portion) of the device.

Figure 1:
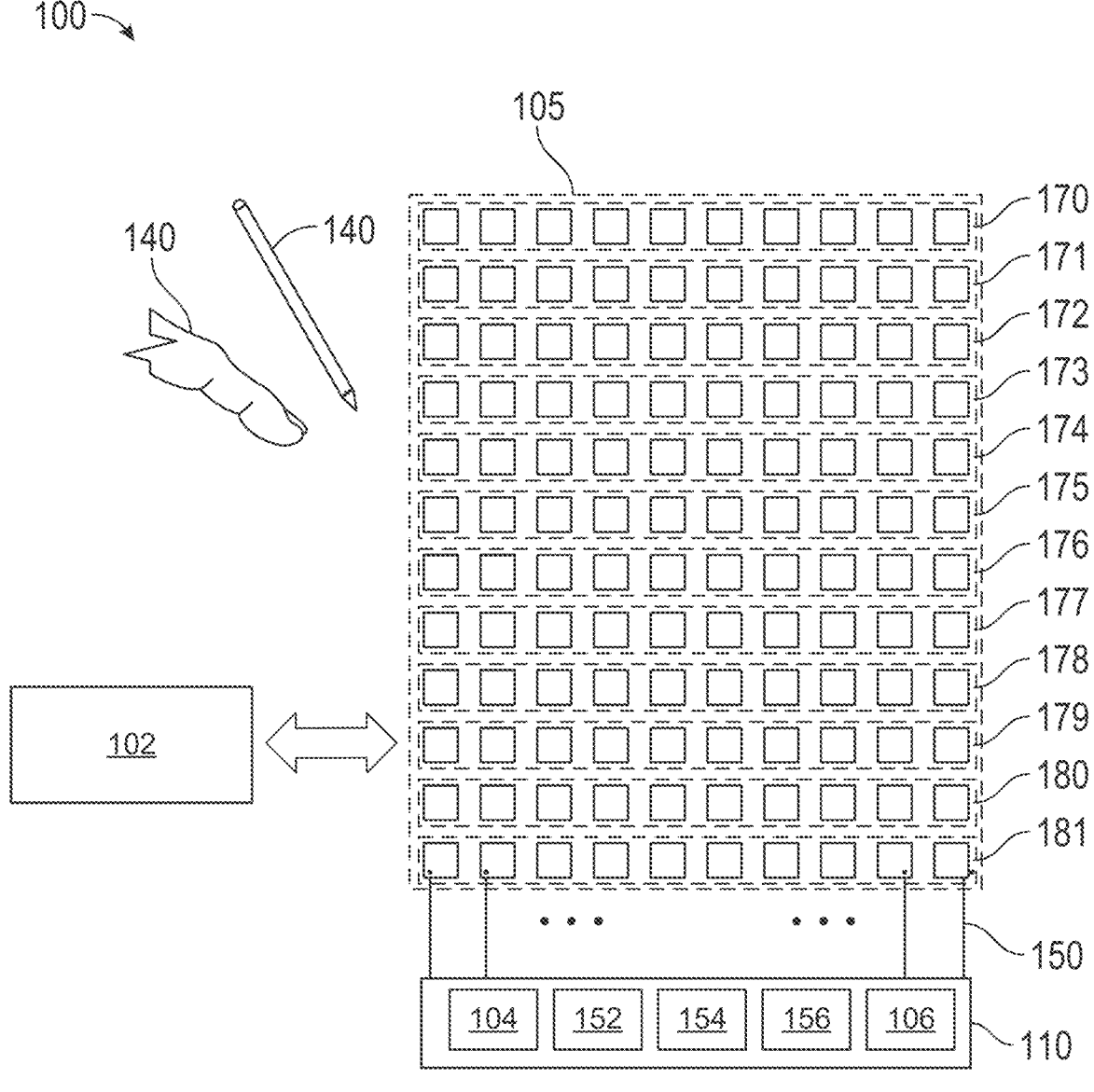
FIG. 1 is a block diagram of an input device, according to one or more embodiments.

FIG. 1 illustrates an input device 100 configured to provide input to an electronic system 102, which is used to detect presence of an input object and determine the state of the electronic system 102 as described herein. Some non-limiting examples of electronic systems include laptop computers, netbook computers, tablets, terminals, kiosks, mobile devices (e.g., cellular phones) including foldable and rollable mobile devices, automotive multimedia centers and internet of things (IoT) devices, among others. The input device 100 may be part of the electronic system 102 or may be a separate component communicatively coupled to the electronic system 102.

The input device 100 includes a processing system 110 and sensor electrodes 105. The processing system 110 operates the sensor electrodes 105 to detect one or more input objects 140 or other condition in a sensing area of the input device 100. Example input objects 140 include fingers and styli, as shown in FIG. 1. Input objects may include parts of a hand other than a finger, such as a palm or side of the hand. Other conditions include a state of the device, e.g., whether the input device such as a laptop or other electronic device is in an opened or closed state.

The sensing area of the input device 100 encompasses any space above, around, in and/or near the input device 100 in which the input device 100 is able to detect user input, e.g., user input provided by one or more input objects 140, or is able to detect other conditions.

Figure 2:
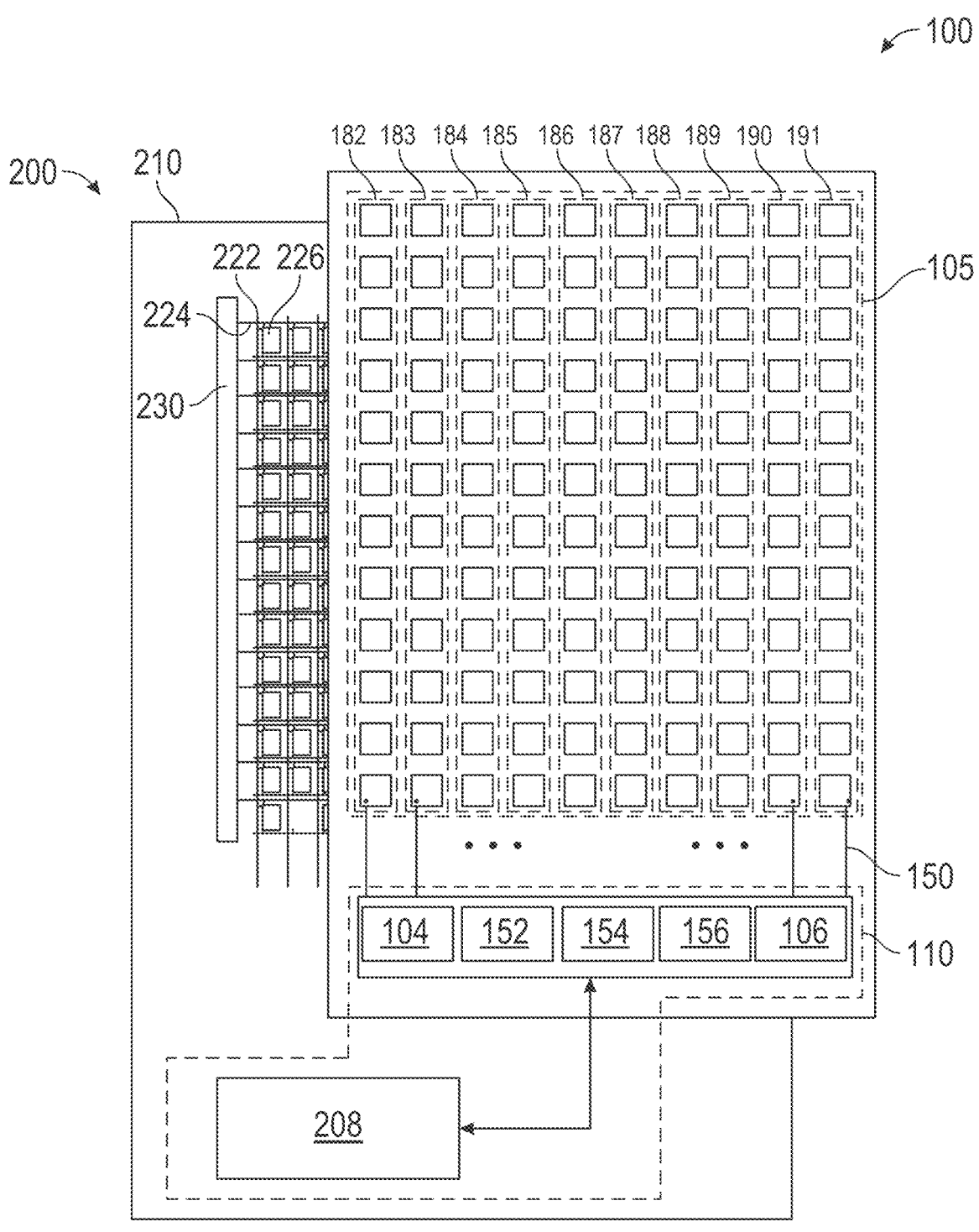
FIG. 2 is a block diagram of an input device with integrated display, according to one or more embodiments.

The sensor electrodes 105 are coupled to the processing system 110 via conductive paths, e.g., traces 150. An exemplary pattern of the sensor electrodes 105 illustrated in FIG. 1 comprises an array of sensor electrodes 105 disposed in a plurality of rows and columns. In one example, the sensor electrodes 105 may be configured to operate in rows, e.g., rows 170-181. In other embodiments, the sensor electrodes may be configured to operate in columns, e.g., columns 182-191 (FIG. 2). In yet other embodiments, the sensor electrodes are configured to operate in rows and columns. It is contemplated that the sensor electrodes 105 may be arranged in other patterns, such as polar arrays, repeating patterns, non-repeating patterns, non-uniform arrays, or other suitable arrangement. Further, although depicted as squares, the sensor electrodes 105 may have any suitable shape, such as circular, rectangular, diamond, star, square, nonconvex, convex, nonconcave, concave, or other geometry. Although shown as being comprised of individual electrodes, the rows 170-181 and/or columns 182-191 may be formed of continuous conductors.

The sensor electrodes 105 may be disposed in a common layer, e.g., transmitter and receiver electrodes in the common layer. For example, the sensor electrodes 105 may be disposed on a first side of a common substrate. In other embodiments, the sensor electrodes 105 may be disposed in two or more layers. For example, a portion of the sensor electrodes 105 (e.g., transmitter electrodes) may be disposed on a first layer and another portion of the sensor electrodes (e.g., receiver electrodes) may be disposed on a second layer. The first and second layers may be disposed on different sides of a common substrate, or disposed on different substrates.

The sensor electrodes 105 may be comprised of a conductive material such as a metal mesh, indium tin oxide (ITO), or the like. Further, the sensor electrodes 105 are ohmically isolated from each other such that one or more insulators separate the sensor electrodes and prevent them from electrically shorting to each other.

The processing system 110 includes a sensor circuit 104. Further, the processing system 110 may include a determination circuit 106, which may be part of the sensor circuit 104 or may form a different circuit. The processing system 110 is configured to operate the sensor electrodes 105 to detect one or more input objects 140 or other condition in the sensing area of the input device 100. The processing system 110 fully or partially resides in one or more integrated circuit (IC) chips. For example, the processing system 110 may include a single IC chip. Alternatively, the processing system 110 includes multiple IC chips. The processing system may also include one or more discrete circuits.

The sensor circuit 104 is coupled to the sensor electrodes 105 via the routing traces 150 and is configured to drive the sensor electrodes 105 with sensing signals to detect one or more input objects 140 or other condition in the sensing area of the input device 100. The sensor circuit 104 may also be configured to drive the sensor electrodes 105 with other signals, such as guarding signals and/or ground signals.

The sensor circuit 104 includes digital and/or analog circuitry. For example, the sensor circuit 104 comprises transmitter (or driver) circuitry configured to drive or transmit sensing signals onto the sensor electrodes 105 and receiver circuitry to receive resulting signals from the sensor electrodes 105. The transmitter circuitry may include one or more amplifiers and/or one or more modulators configured to drive sensing signals on to the sensor electrodes 105.

The processing system 110 may include analog to digital converters (ADCs and/or DACs) 154, analog front ends (AFEs) 152 comprising, for example, integrators configured to receive resulting signals from the sensor electrodes 105. The processing system 110 may include compensation circuitry 156 configured to provide signals to compensate for background capacitance. The ADCs (and/or DACs) 154, AFEs 152 and compensation circuitry 156 may be part of the sensor circuit 104 or may form different circuits. The processing system 110 may be communicatively coupled to an integral or separate memory. The memory may be volatile or non-volatile and may be used to store non-transitory computer readable instructions for carrying out the methods and processes described herein as well as to store data, such as data relating to resulting signals, sensed images, and reference images to name but a few examples.

The sensor circuit 104 may drive the sensor electrodes in various modes. In some modes, the sensor circuit 104 may utilize all sensor electrodes 105 to detect an input object. In other modes, the sensor circuit 104 may only utilize a subset of the sensor electrodes 105 to detect an input object.

In certain embodiments or modes, the sensor circuit 104 drives a first one or more of the sensor electrodes 105 (transmitter electrodes) with a transcapacitive sensing signal and receives a resulting signal with a second one or more of the sensor electrodes 105 (receiver electrodes) to operate the sensor electrodes 105 for transcapacitive sensing. Operating the sensor electrodes 105 for transcapacitive sensing detects changes in capacitive coupling between sensor electrodes driven with a transcapacitive sensing signal and sensor electrodes operated as receiver electrodes. The capacitive coupling may be reduced when an input object (e.g., the input object 140) coupled to a system ground approaches the sensor electrodes. Driving the sensor electrodes 105 with transcapacitive sensing signals comprises modulating the sensor electrodes 105 relative to a reference voltage, e.g., system ground.

Transcapacitive sensing can be parallel or non-parallel. Non-parallel transcapacitive sensing may include driving transmitter electrodes of one orientation (e.g., rows or columns) of the sensor electrodes 105 with a transcapacitive sensing signal and reading electrodes of another orientation (e.g., columns or rows) of the sensor electrodes 105 to obtain resulting signals and/or vice versa. Parallel transcapacitive sensing may include driving transmitter electrodes of one orientation (certain rows or columns) of the sensor electrodes 105 with a transcapactivie sensing signal and reading other electrodes of the same orientation (other rows or columns) to obtain resulting signals. Parallel transcapacitive sensing is further described in U.S. patent application Ser. No. 18/643,808, entitled "System and Method for Parallel Touch Sensing," the entire contents of which are expressly incorporated by reference.

The transcapacitive sensing signal is a periodic or aperiodic signal that varies between two or more voltages. Further, the transcapacitive sensing signal typically has a frequency between 50 kHz and 1 MHz, but in other embodiments other frequencies may be utilized. The transcapacitive sensing signal may have a peak-to-peak amplitude in a range of about 1 V to about 10 V. However, in other embodiments, the transcapacitive sensing signal may have a peak-to-peak amplitude greater than about 10 V or less than about 1 V. Additionally, the transcapacitive sensing signal may have a square waveform, a sinusoidal waveform, triangular waveform, a trapezoidal waveform, or a sawtooth waveform, among others.

In some embodiments, operating the sensor electrodes 105 to receive resulting signals comprises holding the sensor electrodes 105 at a substantially constant voltage or modulating the sensor electrodes 105 relative to the transcapacitive sensing signal. A resulting signal includes effect(s) corresponding to one or more transcapacitive sensing signals, and/or to one or more sources of environmental interference, e.g., other electromagnetic signals.

In other embodiments or modes, the sensor circuit 104 operates the sensor electrodes 105 for absolute capacitive sensing by driving a first one or more of the sensor electrodes 105 with an absolute capacitive sensing signal and receiving a resulting signal with the driven sensor electrodes. Operating the sensor electrodes 105 for absolute capacitive sensing detects changes in capacitive coupling between sensor electrodes driven with an absolute capacitive sensing signal and an input object (e.g., the input object 140). The capacitive coupling of the sensor electrodes 105 driven with the absolute capacitive sensing signal is altered when an input object (e.g., the input object 140) coupled to a system ground approaches the sensor electrodes.

The absolute capacitive sensing signal is a periodic or aperiodic signal that varies between two or more voltages. Further, the absolute capacitive sensing signal typically has a frequency between about 50 kHz and about 1 MHz, but in other embodiments, other frequencies may be utilized. Additionally, the absolute capacitive sensing signal may have a square waveform, a sinusoidal waveform, triangular waveform, a trapezoidal waveform, or a sawtooth waveform, among others. The absolute capacitive sensing signal may have a peak-to-peak amplitude in a range of about 1 V to about 10 V. However, in other embodiments, the absolute capacitive sensing signal may have a peak-to-peak amplitude greater than about 10 V or less than about 1 V. In various embodiments, driving the sensor electrodes 105 with an absolute capacitive sensing signal comprises modulating the sensor electrodes 105. A resulting signal received while performing absolute capacitive sensing may comprise effect(s) corresponding to one or more absolute capacitive sensing signals, and/or to one or more sources of environmental interference, e.g., other electromagnetic signals. The absolute capacitive sensing signal may be the same or different from the transcapacitive sensing signal used in transcapacitance sensing.

In certain embodiments, the sensor circuit 104 drives a subset of the sensor electrodes 105 with a guard signal. A sensor electrode driven with a guard signal may be referred to as a guarded sensor electrode or guard electrode. Driving a sensor electrode with a guard signal mitigates a voltage difference between the guarded sensor electrode and a sensor electrode driven with the absolute capacitive sensing signal in parallel. Driving the guard signal onto a first one or more sensor electrodes while driving the sensing signal onto a second one or more sensor electrodes results in little or no change in capacitance between the guarded sensor electrode(s) and the sensor electrode(s) driven with the absolute capacitive sensing signal.

The sensor circuit 104 may drive the sensor electrodes 105 in multiple modes. For example, the sensor circuit 104 may drive the sensor electrodes 105 in a non-parallel transcapacitive mode during a first time period and an absolute capacitive mode during a second time period. Further, the sensor circuit 104 may drive the sensor electrodes 105 with multiple versions of a particular mode. For example, the sensor circuit 104 may drive the sensor electrodes in a parallel transcapacitive sensing mode during a first period of time and a non-parallel transcapacitive sensing mode during a second period of time. Non-parallel transcapacitive sensing, for example, involves driving either rows or columns with a transcapacitive sensing signal and reading resulting signals from the other of the rows or columns as previously described. Parallel transcapacitive sensing involves both driving and reading electrodes having generally the same general orientation (e.g., non-overlapping).

The determination circuit 106 receives the resulting signals from the sensor circuit 104 and processes the resulting signals to determine changes in capacitive coupling of the sensor electrodes 105. The determination circuit 106 utilizes the changes in capacitive coupling of the sensor electrodes 105 to determine positional information of one or more input objects (e.g., the input object 140) or to determine a change in capacitance for other reason. The determination circuit may subtract a baseline signal from the resulting signal where the baseline represents the resulting signal when no input object or other feature is proximate thereto. The determination circuit 106 may perform other functions, such as measuring the amount of noise present in one or more regions of a sensing area and/or determining whether positional information has been corrupted or degraded by noise. The determination circuit 106 may be part of the sensor circuit 104 or may be a separate circuit.

In one or more embodiments, measurements of the changes in capacitive coupling determined from the resulting signals received from the sensor electrodes 105 may be utilized by the determination circuit 106 to form a capacitive image. As part of this process a baseline may be subtracted from resulting signals. The baseline corresponds to the value of a sensor electrode 105 in the absence of an input object or other feature being proximate thereto. The resulting signals utilized to detect the changes in capacitive coupling are received during a capacitive frame. A capacitive frame may correspond to one or more capacitive images. Multiple capacitive images may be acquired over multiple time periods, and differences between the images used to derive information about an input object 140 in the sensing area of the input device 100. For example, successive capacitive images acquired over successive periods of time can be used to track the motion(s) of one or more input objects entering, exiting, and within the sensing area.

"Positional information" as used herein broadly encompasses absolute position, relative position, velocity, acceleration, and other types of spatial information in zero, one, two or three dimensions as appropriate. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

FIG. 2 illustrates an example of the input device 100 wherein the input device is shown overlapped and/or integrated with a display of a display device 200. The display of the display device 200 may be any suitable type of display such as, for example, light emitting diode (LED), microLED, organic LED (OLED), microOLED, liquid crystal display (LCD), plasma, electroluminescence (EL), or other display technology.

The display device 200 includes a display panel 210 communicatively coupled with a display driver 208 and gate selection circuitry 230. The display panel 210 includes display electrodes that are driven to update subpixel electrodes 226 of the display panel 210. The display electrodes include data lines 222 and gate lines 224, among others. The display driver 208 may be part of the processing system 110 (FIG. 1) or may be a separate component.

The data lines 222 are coupled to the display driver 208 and the gate lines 224 are coupled to the gate selection circuitry 230. Each of the subpixel electrodes 226 is coupled to one of the gate lines 224 and one of the data lines 222. The gate selection circuitry 230 is configured to drive gate select and gate deselect signals onto the gate lines 224 to select (activate) and deselect (deactivate) corresponding subpixels for updating.

The display driver 208 includes display driver circuitry configured to drive the data lines 222 with subpixel data signals to update the selected subpixels electrodes 226 and update the display of the display device 200. For example, the display driver 208 may drive display update signals onto the data lines 222 during corresponding display updating periods.

The display driver 208 is configured to update the subpixel electrodes 226 to update an image displayed on the display panel 210 during display frames. The display frames may be updated, or refreshed, once about every 16 ms, generating a display refresh rate of about 60 Hz. In other embodiments, other display refresh rates may be employed. For example, the display refresh rate may be 90 Hz, 120 Hz, 140 Hz, or greater.

The display driver 208, the sensor circuit 104, the determination circuit 106, the AFEs 152, the ADCs (and/or DACs) 154, and the compensation circuitry 156 may be part of a common processing system (e.g., the processing system 110 forms a touch and display controller). Alternatively, the display driver 208 may be part of a first processing system and the sensor circuit 104, AFEs 152, the ADCs (and/or DACs) 154, the compensation circuitry 156, and the determination circuit 106 may be part of a second processing system. Further, the display driver 208, the sensor circuit 104, the AFEs 152, the ADCs (and/or DACs) 154, the compensation circuitry 156 and the determination circuit 106 may be part of a common IC chip. Alternatively, one or more of these components may be disposed in a first IC chip and a second one or more of these components may be disposed on a second IC chip, etc. As an alternative, any of the sensor circuit 104, AFEs 152, the ADCs (and/or DACs)

154, the compensation circuitry 156, and/or the determination circuit 106 may be implemented in whole or in part by one or more discrete circuits.

In various embodiments, the sensor circuit 104 is configured to drive the sensor electrodes for capacitive sensing during a capacitive frame at a capacitive frame rate. Further, each capacitive frame may include multiple periods during which different sensor electrodes 105 are operated for capacitive sensing.

The "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or multiple of the display frame rate. Further, the capacitive frame rate may be a rational fraction of the display rate (e.g., 1/2, 2/3, 1, 3/2, 2). In one or more embodiments, the display frame rate may change while the capacitive frame rate remains constant. In other embodiment, the display frame rate may remain constant while the capacitive frame rate is increased or decreased. Alternately, the capacitive frame rate may be unsynchronized from the display refresh rate or the capacitive frame rate may be a non-rational fraction of the display rate to minimize interference "beat frequencies" between the display updating and the input sensing.

In one or more embodiments, capacitive sensing (or input sensing) and display updating may occur during at least partially overlapping periods. For example, the sensor circuit 104 is configured to operate the sensor electrodes 105 for capacitive sensing while the display driver 208 operates the gate lines 224 and data lines 222 to update an image displayed by the display panel 210. For example, updating the display panel 210 and operating the sensor electrodes 105 for capacitive sensing may be asynchronous with each other. Further, updating the display panel 210 and operating the sensor electrodes 105 for capacitive sensing may or may not be synchronized with each other.

In one or more embodiments, updating the display panel 210 and operating the sensor electrodes 105 for capacitive sensing may occur during non-overlapping periods. For example, updating the display panel 210 may occur during display update periods and operating the sensor electrodes 105 for capacitive sensing may occur during non-display update periods. The non-display update periods may be a blanking period that occurs between the last line of a display frame and the first line of the following display frame (e.g., during a vertical blanking period). Further, the non-display update periods may occur between display line update periods for two consecutive display lines of a display frame and are at least as long in time as the display line update period. In such embodiments, the non-display update period may be referred to as a long horizontal blanking period or long h-blanking period, where the blanking period occurs between two display line updating periods within a display frame and is at least as long as a display line update period.

Figure 3A:
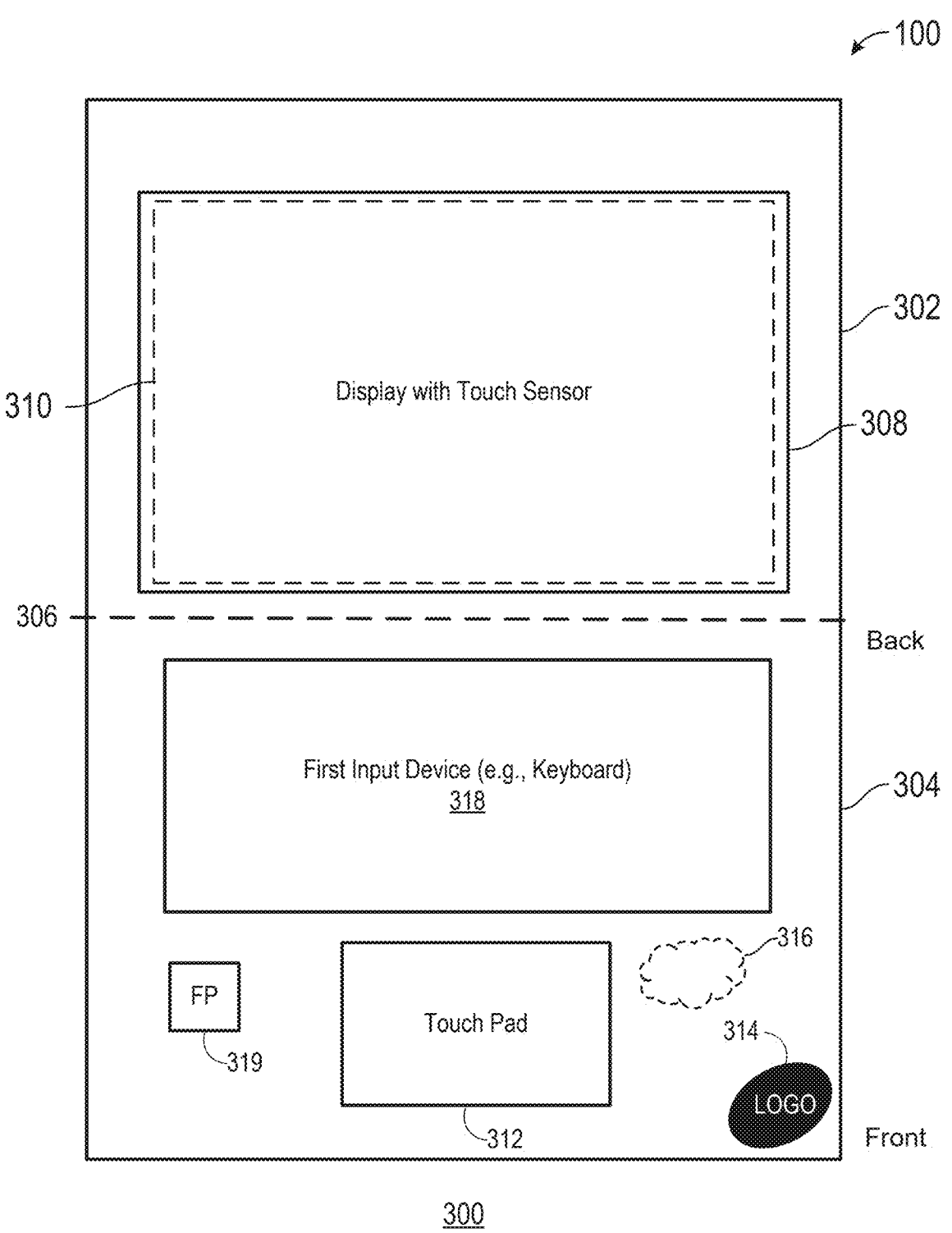
FIG. 3A is a block diagram of an input device, according to one or more embodiments.
Figure 3B:
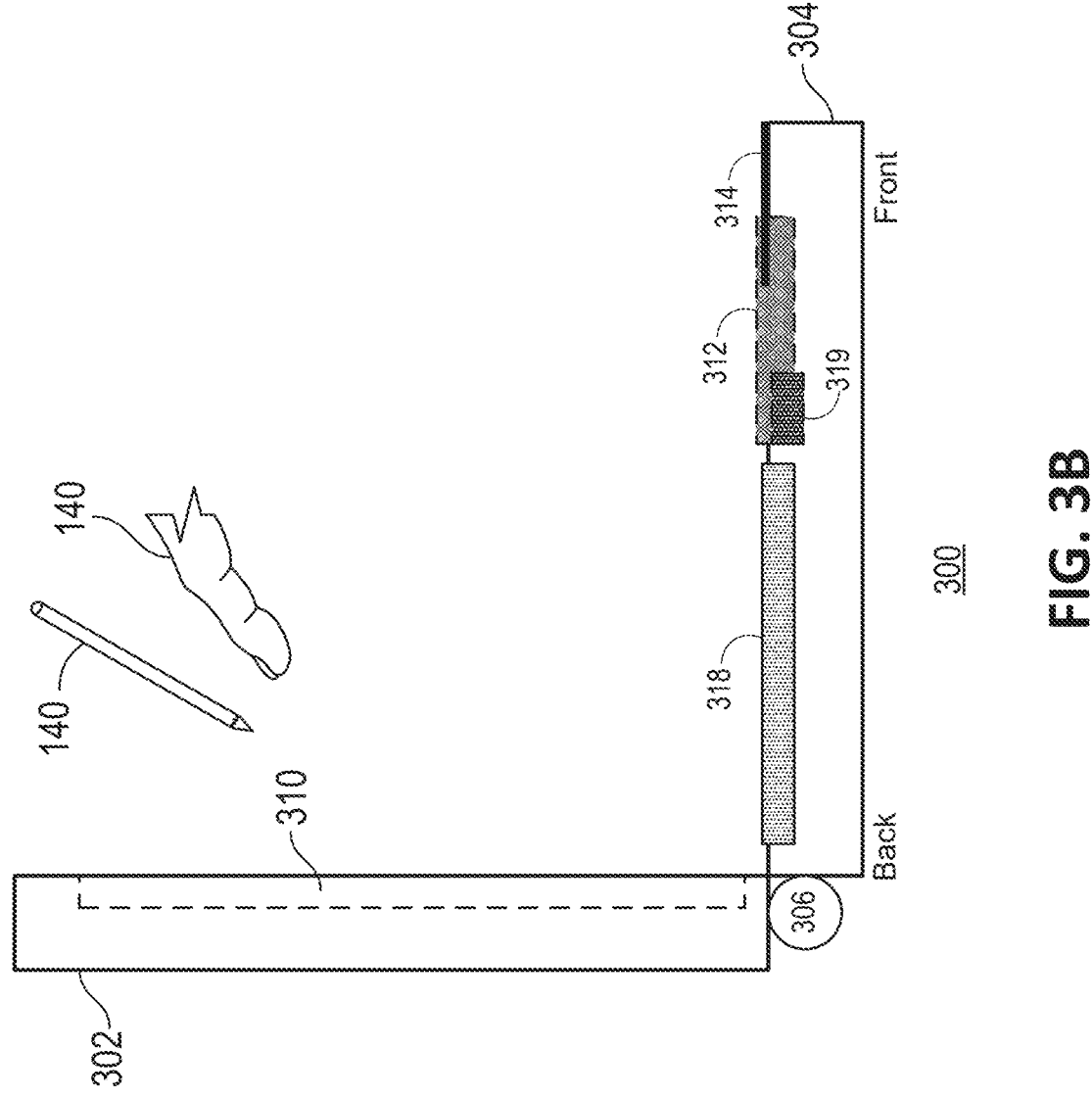
FIG. 3B is a block diagram of an input device in an opened state, according to one or more embodiments.
Figure 3C:
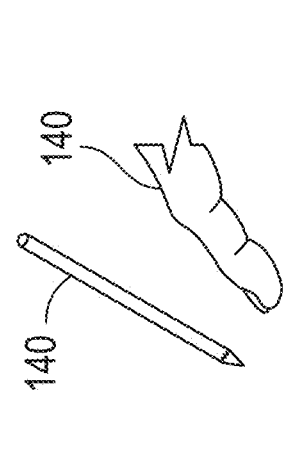
FIG. 3C is a block diagram of an input device in a closed state, according to one or more embodiments.
Figure 3C:
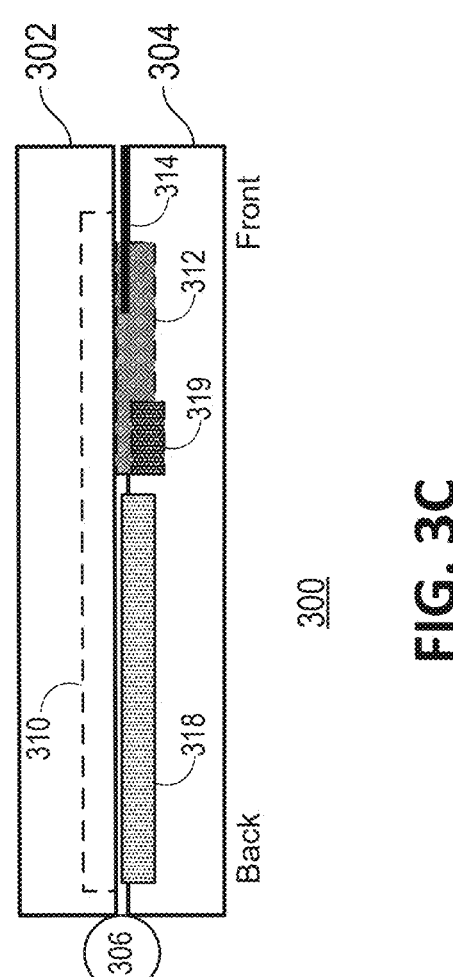

FIG. 3A illustrates an example of an input device 100, which in the example shown is a closeable device 300, e.g., such as a laptop. Other examples of a closeable device 300 include a tablet, foldable phone and the like. The closeable device 300 includes a first portion 302 and a second portion 304. In the example shown, the first portion 302 and the second portion 304 are rotatable about an axis, e.g., hinged structure 306, such that the closeable device 300 may be placed in an opened and closed state as generally shown in FIG. 3B and FIG. 3C. It will, however, be appreciated that the first portion 302 and the second portion 304 may be closable without the presence of a hinge structure 306. A processing system used to control a touch sensor 310, and in certain embodiments display panel 308, may be located in the first portion 302 or the second portion 304.

The first portion includes the touch sensor 310 such as described, by way of example, in connection with FIG. 1 and FIG. 2. The closcable device 300 may also include the integrated display 308 as described in connection with FIG. 2. The touch sensor 310 may be a capacitive sensor with sensor electrodes 105, although it will be understood that the methods and systems herein may be implemented with other touch sensing technology.

The touch sensor 310 may be operated in various modes such as, for example, non-parallel transcapacitive, parallel transcapacitive, and absolute capacitive as previously described. The capacitive frame rate at which the sensor electrodes 105 are driven to detect a touch or other condition may vary. For example, when a touch has been detected in the sensing area of the touch sensor 310, the touch sensor 310 may operate in an active mode with a relative high capacitive frame rate, e.g., sensing may be done at a rate of 100 to 200 Hz, e.g., at 5 to 10 ms intervals. If no touch has been detected within a set period of time, the capacitive frame rate may be reduced to a semi-active mode, e.g., sensing may be done less frequently than the active mode such as, for example, at 30 ms intervals. If, as described below, the closeable device 300 is determined to be in a closed state, the capacitive frame rate may be reduced even further to a low power mode, for example, at 100 ms intervals.

The second portion 304 include various features that can be imaged by the touch sensor 310 and used to determine when the device is in an opened state or closed state. These features may be functional or non-functional and may or may not be visible to a user. For example, the second portion 304 may include an input device, such as a keyboard 318. Other features may include a fingerprint sensor 319 and touch pad 312. Yet other features may include a logo 314, which may comprise a label and/or embossed lettering. Other features that may be imaged by the touch sensor 310 may include circuitry or other structure within the housing of the second portion 304, which is illustratively depicted by non-visible feature 316. It will understood that the features described for the second portion 304 are merely provided by way of example to illustrate the embodiments described herein. More generally, the second portion 304 includes various features which differ with respect to materials used, grounding and that vary in proximity to the touch sensor 310 when the device is closed.

As will become apparent from the description that follows, the system and method described herein use the touch sensor 310 to generate an image of the area proximate to the sensing area. In a closed state, features proximate to the sensing area, e.g., one or more of features 312-319, are sufficiently proximate to the sensing area of the touch sensor 310 to provide resulting signals that may be converted to usable data in a capacitive image. By comparing an acquired image to a reference image, the processing system can determine if the input device is in an opened or closed state and execute appropriate action based on the determined state.

FIG. 3B illustrates an example of the closeable device 300 in an opened state. In operation, the touch sensor 310 may operate in various sensing modes. When the closcable device 300 is in an opened state, the touch sensor 310 may detect the presence or absence of an input object 140 (e.g., finger, styli, etc.) proximate to the touch sensor 310. When a touch is detected, the processing system 110 may operate the touch sensor 310 in the active mode, e.g., drive sensor electrodes at a relatively high rate. Alternatively, the touch sensor 310 may not detect the presence or absence of an input object 140, but the closeable device 300 may nonetheless be in an opened state. The sensor circuit 104 may scan for a touch or other condition less frequently than in active mode, e.g., in the semi-active mode.

In the opened state, features of the closeable device 300 on the second portion 304 are not proximate to the touch sensor 310. Thus, for example, the touch sensor 310 will not detect features such as keyboard 318, fingerprint sensor 319, touchpad 312, logo 314 and/or other features (e.g., non-visible features 316) which may be present on the second portion 304. Therefore, according to certain embodiments herein, the processing system 110 determines that the closeable device 300 is in an opened state. Touch sensing and, if applicable, display can remain in active or semi-active mode, e.g., sensing for presence of an input object and displaying intended content.

FIG. 3C illustrates an example of the closeable device 300 in a closed state. When closed, the touch sensor 310 may initially continue to operate in various sensing modes as described in connection with FIG. 3A. The touch sensor 310 will not detect the presence or absence of an input object 140 (e.g., finger, styli, etc.) because, in the configuration shown, input objects cannot access the touch sensor 310 with sufficient proximity to be detected.

The touch sensor 310, in the closed state, is proximate to features of the second portion 304, such as the fingerprint sensor 319, the touchpad 312, logo 314, keyboard 318 and non-visible feature 316 (not shown). In accordance with the methods and systems described herein, the processing system determines that the closeable device 300 is in a closed state. Each of the features 312, 314, 316, 318, and 319 have certain characteristics. For example, features 312, 314, 316, 318, and 319 are made of certain materials, have a potential relative ground, and will have a certain proximity (e.g., distance) to the first portion 302, and hence touch sensor 310, of the closcable device 300 when closed. These characteristics affect capacitive coupling between the transmitter and receiver electrodes of the touch sensor 310 thereby allowing at least certain features to be captured in the capacitive image.

When the closcable device 300 is determined to be in a closed state, the processing system may execute certain actions. For example, the closeable device 300 may be placed in a locked state and require authentication to unlock the device. The touch sensor 310 may also be placed in a low power state, for example, with a relative low capacitive frame rate, e.g., 100 ms intervals, to see if the device has opened. Active and/or semi-active sensing may be suspended. When employed, the integrated display 308 may be disabled, turned off or otherwise placed in mode to consume low power.

Figure 3D:
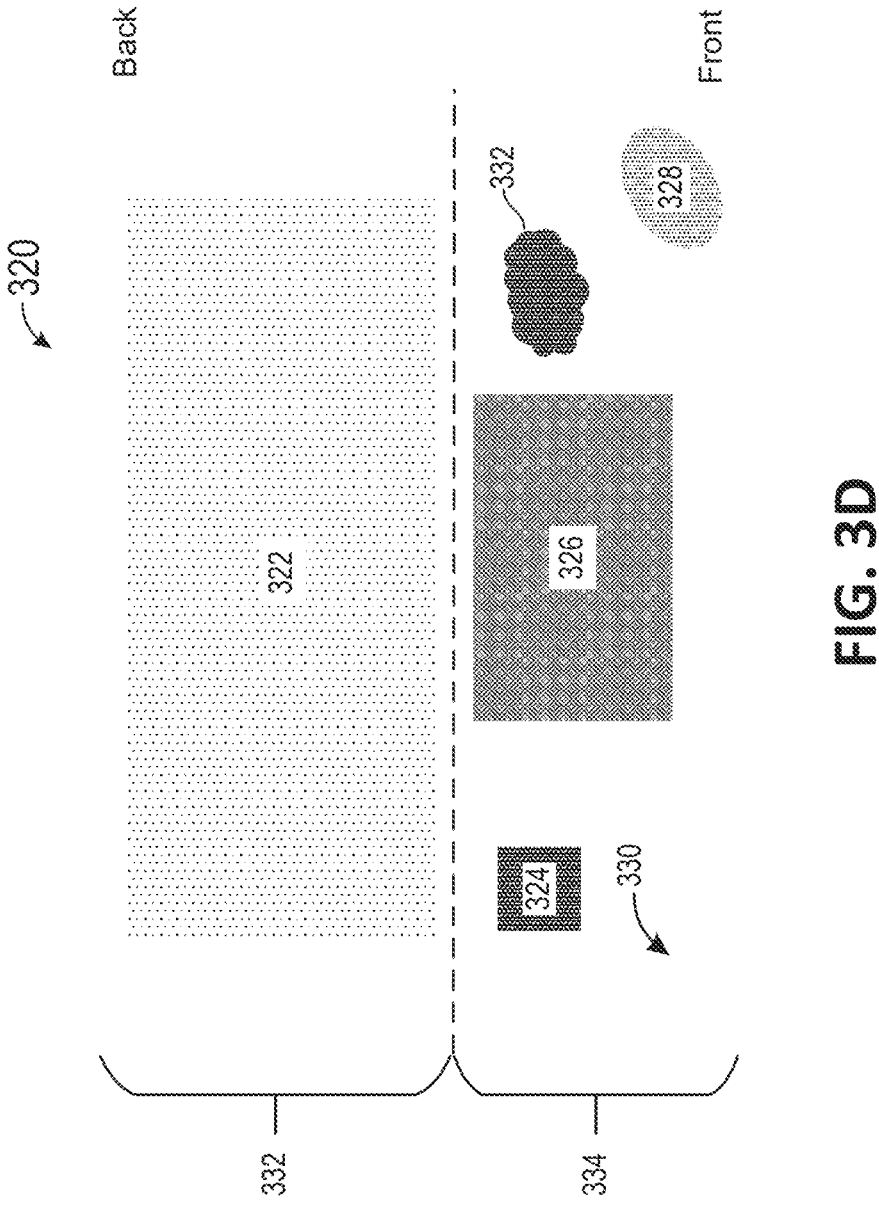
FIG. 3D illustrates an image of a portion of an input device, according to one or more embodiments.

FIG. 3D graphically depicts an illustrative example of data corresponding to a capacitive image 320 of a second portion of a device, e.g., portion 304, of the closeable device 300, captured by the touch sensor 310 when the device is in a closed state. The data is obtained by using the touch sensor 310 to generate sensing signals and to receive resulting signals over part or all of the touch sensor 310 to generate the capacitive image 320. As previously described, any suitable means may be used for touch sensing including, for example, absolute capacitance, non-parallel transcapacitance and parallel transcapacitance. Non-capacitive touch sensing technology may also be used.

As shown, the capacitive image 320 includes data corresponding to various features such as, for example, image data 322 corresponding to the keyboard 318, image data 324 corresponding to the fingerprint sensor 319, image data 326 corresponding to the touchpad 312, and image data 332 corresponding to the non-visible features 316, and as well as image data corresponding to other areas. Different shading in FIG. 3D corresponds to the different features and more particularly to varying signal strength of resulting signals read from different corresponding areas of the touch senor 310 when in a closed position as shown, for example, in FIG. 3C. The capacitive image 320 may correspond to image data from the touch sensor 310 during use, referred to herein as an acquired image, or may correspond to a reference image to which an acquired image is compared as will be further described in connection with FIG. 5.

FIG. 3D is graphically shown in simplified form, e.g., areas corresponding to each feature are shown as having consistent data thereby representing same or similar signal strength of resulting signals across each respective feature. It will be appreciated that the signal strength across each feature may vary considerably depending on differences in materials, ground, etc. across the area of a particular feature. Further the capacitive image may be, and typically would be, represented in other forms, e.g., numerical values corresponding to the signal strength for each position of sensing area.

In certain embodiments, the capacitive image 320 may only comprise data for a limited portion of the second portion 304 of the closeable device 300. For example, the capacitive image 320 may include data corresponding to features in region 334 and not include features in region 332 or vice versa. Further, the capacitive image 320 may include data for a limited number of features in a particular region. For example, in region 334, the capacitive image 320 may include data for features 324, 326 and 328, but not data for areas 330 or non-visible feature 316. Using a simplified data set can improve processing time when determining whether the device is in an opened or closed state. Further, in certain modes, the processing system 110 may collect data for all regions of the second portion 304. In other modes, the processing system 110 may collect data for only certain regions and/or only certain features within a particular region(s) as previously described.

Figure 4:
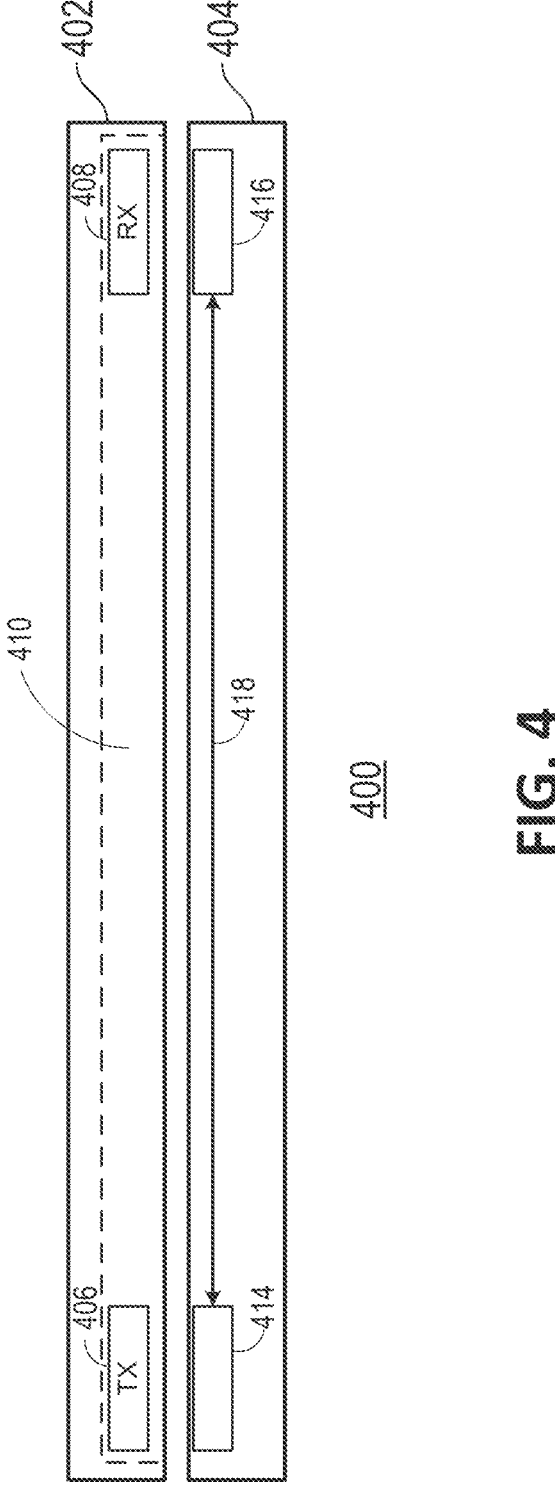
FIG. 4 illustrates an alternative embodiment of an input device, according to one or more embodiments.

FIG. 4 illustrates an alternative embodiment of an input device 100 in the form of a closable device 400 which can detect opened and closed states. Similar to FIG. 3A, the closable device 400 is a foldable or otherwise closable device with a first portion 402 and second portion 404. The closable device 400 may be placed in an open and closed state as generally shown in FIG. 3B and FIG. 3C. As will be apparent, the configuration shown in FIG. 4 is in the closed state.

The first portion includes a touch sensor 410 such as described, by way of example, in connection with FIG. 1 and FIG. 3A. The closable device 400 may also include an integrated display such as described in connection with FIG. 2, which for simplicity is not shown. The touch sensor 410 may be a capacitive touch sensor with sensor electrodes 105.

The first portion 402 includes a first electrode 406 that is configured as a transmitter electrode and a second electrode 408 that is configured as a receiver electrode. The first electrode 406 and the second electrode 408 may each include a subset of electrodes 105 as shown in FIG. 1 and FIG. 2. In certain embodiments, the subset of electrodes used for the first electrode 406 and the second electrode 408 may each form a row or partial row or may each form a column or partial column. The first electrode 406 and the second electrode 408 may extend along and proximate to a first edge and a second edge of the first portion 402. In other embodiments, the first electrode 406 and the second electrode 408 may be disposed in a corner area of the first portion 402.

The second portion 404 include includes a first conductor 414 and a second conductor 416. At least a portion of the first conductor 414 is disposed under the first electrode 406 and at least a portion of the second conductor 416 is disposed under the second electrode 408 when the closable device 400 is in a closed position. The first conductor 414 and second conductor 416 may be formed as conductive pads, e.g., that are disposed proximate to the corners of the closeable device 400 or may be formed of conductive bars proximate to edges of the closeable device 400.

The first conductor 414 and the second conductor 416 may be affixed in or to the housing of the closable device 400. In other embodiments, the first conductor 414 and the second conductor are not affixed in or to a housing of the closable device 400. The first conductor 414 and the second conductor 416 are sufficiently proximate to the first portion 402 when the closable device 400 is in the closed state such that the first conductor 414 is electrically coupled to the first electrode 406 (transmitter electrode) and the second conductor 416 is electrically coupled to the second electrode 408 (receiver electrode). Further, the first conductor 414 is electrically coupled to the second conductor 416 by conductive path 418, which may be a conductor or other suitable transmission medium sufficient to transmit a signal from the first conductor 414 to the second conductor 416.

The sensor circuit 104 periodically drives the first (transmitter) electrode 406 with a sensing signal. When the closable device 400 is in a closed state, the sensing signal is transmitted from the first electrode 406 (transmitter) to the first conductor 414. The signal then passes from the first conductor 414 to the second conductor 416 through conductive path 418. The signal is then received at the second electrode 408 (receiver). The processing system 110 reads the resulting signal from the second (receiver) electrode 408. If the resulting signal exceeds a threshold, the processing system determines that the closeable device 400 is in a closed state.

Conversely, when the closeable device 400 is in the open state, the distance between the first electrode 406 and the first conductor 414 and/or the distance between the second electrode 408 and the second conductor 416 increases such that electrical coupling is insufficient for signal transmission. Thus, in the open state, when the first electrode 406 is driven with a sensing signal, any resulting signal read from the second electrode 408 does not exceed the threshold value and the processing system determines the closeable device 400 is in an opened state.

The embodiment of FIG. 4 provides for the detection of an opened and closed state without the need to establish a baseline due to the connection of the first conductor 414 and the second conductor 416 via conductive path 418.

Figure 5:
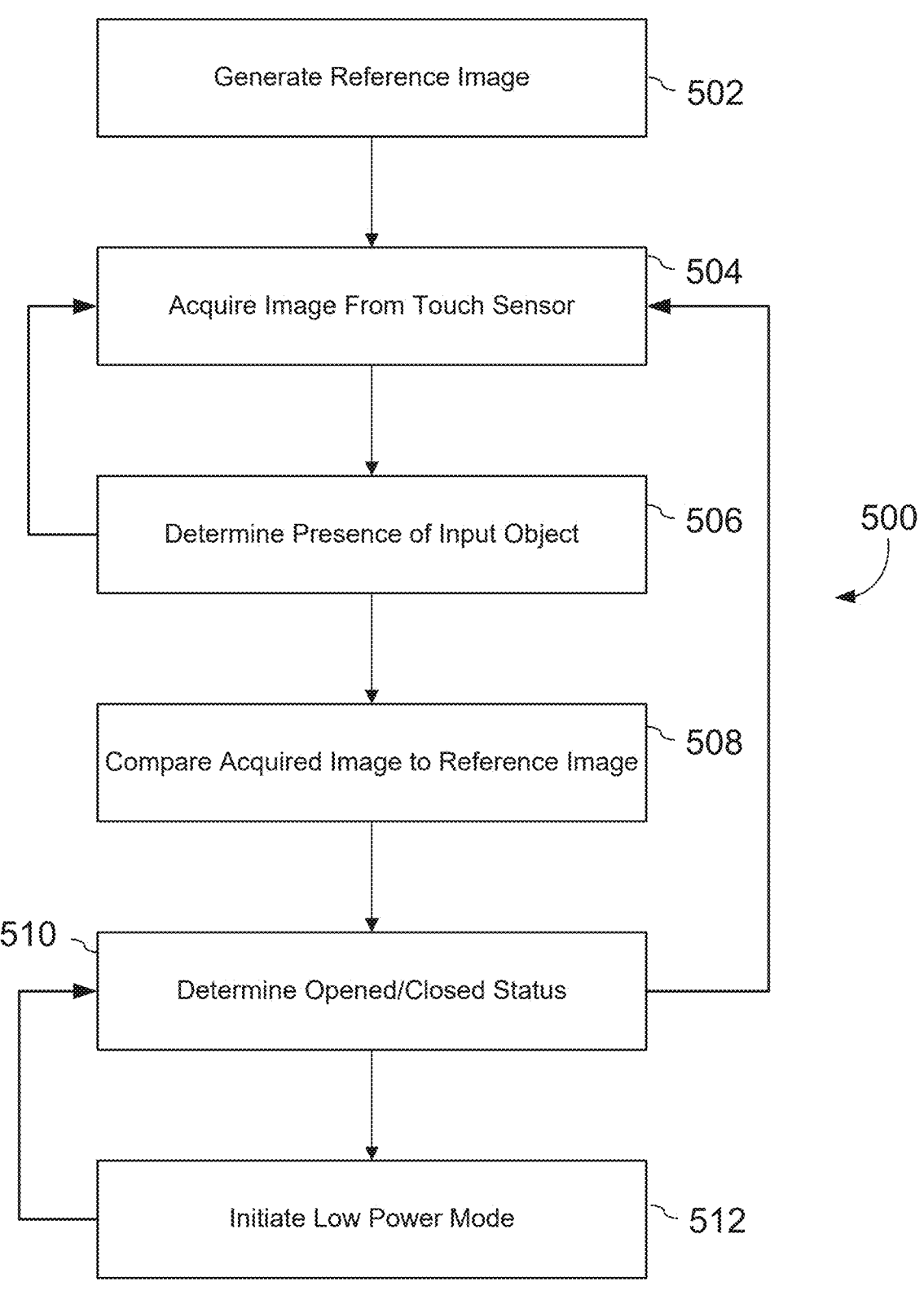
FIG. 5 illustrates a method or process of performing touch sensing with opened and closed detection, according to one or more embodiments.

FIG. 5 illustrates an example of a method or process 500 for determining whether a device, such as a foldable or otherwise closeable device, is in an opened or closed state. It will be appreciated that the stages described below need not be performed in the exact sequence shown except where otherwise apparent from context. Further, certain stages are optional as will likewise be apparent from the description that follows.

For purposes of illustration, the process 500 is described in the context of a capacitive touch sensor. However, it will be understood that any suitable sensing technology can be used for the process described in FIG. 5. In the case of capacitive sensing, any suitable sensing mode may be used, e.g., absolute capacitance, non-parallel transcapacitance or parallel transcapacitance.

At stage 502, a reference image is generated such as shown in the example of FIG. 3D. For example, for a closeable device 300 with a first portion 302 having a touch sensor 310 and a second portion 304 that is opposite the first portion when closed, the reference image corresponds to an image of the second portion 304 facing the touch sensor 310 in the closed position (see FIG. 3D).

The reference image may include data corresponding to an entire surface of the second portion 304 facing the touch sensor 310 or only part or region of the second portion 304 facing the touch sensor 310. For example, the reference image may include only data corresponding to a region 334 of the second portion 304. The reference image may also include data corresponding to only a limited number of features of the region or surface, e.g., may be limited to features 324 or 328 and not include feature 326. It will be understood that these scenarios are provided by way of example and are not intended to limit the scope of the method and system described herein. The reference image need only include data corresponding to features sufficient to determine if the device is in an opened or closed state in accordance with the description herein.

The reference image may be generated using any suitable means. For example, the reference image may be generated based on known features corresponding to a particular make and model of the device. The reference image may be generated by determining an expected image by calculating reference image data based on characteristics of the touch sensor on the first portion of the foldable device and the characteristics of features on the second portion, e.g. material type, and expected location and proximity of the features to the touch sensor when closed. Alternatively, the reference image may be obtained during an initial configuration by placing the device in the closed position and then proceeding through one or more touch sensing periods, e.g., capacitive frames, to generate a capacitive image of the second portion or selected region(s) thereof.

The reference image need only be generated once at stage 502, which stage need not be repeated. Alternatively, in certain embodiments, the reference image may be updated periodically to account for changes to features of the device, e.g., second portion of the foldable device, and/or changing characteristics of the touch sensor. Updating the reference image may be automatic or at direction of the user or both. The reference image may thus be adaptive.

At stage 504, an acquired image is obtained from the touch sensor during a capacitive frame. During the capacitive sensing frame, transmitter electrodes are driven with sensing signals and resulting signals are received and read at the receiver electrodes. As previously described, a baseline may be subtracted from the resulting signals. Data corresponding to the resulting signals (or a baseline subtracted from the resulting signals) over the entire second portion or selected parts thereof is the acquired image.

At stage 506, the processing system determines if a touch or other input object is proximate to the sensing area of the sensor electrodes. If a touch or other input object is detected, the location of the touch or other input object is determined by the determination circuit and the processing system may take appropriate actions, e.g., report the location of the touch to other applications or undertake other desired actions. Because a touch or other input object is proximate to the touch sensor, the processing system determines the device is in an open state. There is, therefore, no need to proceed to stage 508 and the input device may remain in an active mode and return to stage 504 where the next image is acquired at the desired time interval, e.g. every 10 ms. The processing system may repeat stage 504 and 506 until no touch or other input object is detected for a set period of time, e.g., 30 ms. In other embodiments, the process may proceed to stage 508 even though a touch or other input object is detected in the sensing area.

If no touch is detected within the set period of time, as described above, the process proceeds to stage 508. At stage 508, the acquired capacitive image is compared to the reference image and the processing system determines similarity of the acquired capacitive image to the reference image. For example, a score value is assigned based on the comparison of the capacitive image to the reference image with a higher score indicating more similarity of the acquired image to the reference image and a lower score indicating less similarity to the reference image. The score value may, for example, be a value between 0 and 100, although any suitable range may be used.

At stage 510, the processing system determines if the system is in a closed state. For example, a threshold value may be set. When the comparison of the acquired image to the reference image (e.g., score) is less than the threshold, the processing system 110 determines that the system is opened. The processing system may then return to stage 504 and acquire a subsequent image at stage 504 at a rate corresponding to either an active mode, e.g., 10 ms intervals, or semi-active mode, e.g., 30 ms intervals.

If, at stage 510 the score of the comparison of the acquired image to the reference image exceeds the threshold, the processing system 110 determines that the system is in a closed state. The processing system 110 may then initiate certain actions including placing the system in a low power mode. For example, the capacitive frames may be acquired less frequently than in the active and semi-active modes, e.g. at 100 ms intervals. Other actions may be taken. For example, if the system has a display, the display may be disabled, turned off or otherwise put in a low mode. The system may be placed in a locked state and require user credentials such as username, password or require a successful authentication with a biometric process to unlock the device. Further, portions of the touch sensor not associated with features used to detect opened/closed state can be disabled. For example, with reference to FIG. 3D, features 324, 326 and 328 in region 332 may be used for open/close status detection. Channels associated with region 334 may be disabled. Additionally, channels in region 332 not associated with features 324, 326 and 328 may be disabled. These are, of course, provided by way example. Any suitable actions may be executed in when in the low power mode.

The system may remain in the lower power mode until a comparison of an acquired image and the reference image no longer exceeds the threshold or until a touch is detected. At that time, the process may return to stage 504 with a capacitive frame rate set to active or semi-active mode.

In certain embodiments, a baseline may be reestablished periodically during operation of the device. As noted, the baseline represents the value of each location on the touch sensor when no input object is proximate to the sensing area while the device is in opened state. Baseline values may be subtracted from the resulting signals from receiver electrodes. Because baseline values can change over time, reestablishing baseline values facilitates maintaining accuracy of detecting the presence of input objects and other conductions such as whether the device is in a closed or opened state. Re-establishing the baseline values may be referred to as forced relaxation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. For example, although described in the context of capacitive sensors, it will be understood that the methods and systems may be employed with other sensing technologies. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An input device having an opened state and a closed state, the input device comprising:
   a first portion comprising a touch sensor having a sensing area, wherein the touch sensor comprises:
      a plurality of transmitter electrodes;
      a plurality of receiver electrodes;
   a second portion comprising a plurality of features;

a sensor circuit configured to:
      drive the plurality of transmitter electrodes with sensing signals;
      receive resulting signals from the plurality of receiver electrodes;
   a processing system configured to:
      generate a reference image using the sensing area of the touch sensor to image the second portion when the input device is in the closed state, wherein the reference image includes data corresponding to the plurality of features;
      generate an acquired image from at least a portion of the sensing area;
      compare the acquired image to the reference image; and
      determine whether the input device is in the closed state based on the comparison of the acquired image to the reference image.

2. The input device of claim 1, wherein the sensor circuit is configured to drive the plurality of transmitter electrodes with transcapacitive sensing signals.

3. The input device of claim 1, wherein the plurality of features includes at least one non-functional feature and wherein the data corresponding to the plurality of features includes data corresponding the non-functional feature.

4. The input device of claim 1, wherein the first portion further comprises an integrated display.

5. The input device of claim 1, wherein the processing system is further configured to determine the input device is in the opened state.

6. The input device of claim 1, wherein the sensor circuit is further configured to perform forced relaxation.

7. The input device of claim 1, wherein the reference image is adaptive.

8. The input device of claim 1, wherein the processing system is further configured to:
   determine a score value based on the comparison of the acquired image to the reference image;
   compare the score value to a threshold; and
   determine the input device is in the closed state when the score value exceeds the threshold.

9. The input device of claim 1, wherein the plurality of features include at least one of a keyboard, a fingerprint sensor, or a touch pad.

10. A touch sensor having a sensing area, the touch sensor comprising:
   a plurality of transmitter electrodes;
   a plurality of receiver electrodes;
   a sensor circuit configured to:
      drive the plurality of transmitter electrodes with sensing signals;
      receive resulting signals from the plurality of receiver electrodes;
   a processing system configured to:
      generate a reference image of at least a portion of a device using the touch sensor when the device is in a closed state, wherein the reference image includes data corresponding to a plurality of features proximate to the sensing area when the device associated with the touch sensor is in the closed state;
      generate an acquired image from at least a portion of the sensing area;
      compare the acquired image to the reference image; and
      determine whether the device is in the closed state based on the comparison of the acquired image to the reference image.

11. The touch sensor of claim 10, wherein the sensor circuit is configured to drive the plurality of transmitter electrodes with transcapacitive sensing signals.

12. The touch sensor of claim 10, wherein the plurality of features include at least one non-functional feature and wherein the data corresponding to the plurality of features includes data corresponding the non-functional feature.

13. The touch sensor of claim 10, wherein the processing system is further configured to determine the device is in an opened state.

14. The touch sensor of claim 10, wherein the sensor circuit is further configured to perform forced relaxation.

15. The touch sensor of claim 10, wherein the reference image is adaptive.

16. The touch sensor of claim 10, wherein the plurality of features include at least one of a keyboard, a fingerprint sensor, or a touch pad.

17. A method for determining when a device is in a closed state comprising:

driving a plurality of transmitter electrodes of a touch sensor on a first portion of the device with sensing signals;

receiving resulting signals from a plurality of receiver electrodes of the touch sensor on the first portion of the device;

generating a reference image using the touch sensor when the device is in the closed state, wherein the reference image includes data corresponding to a plurality of features of a second portion of the device proximate to the touch sensor when the device is in the closed state;

generating an acquired image from the touch sensor with the resulting signals;

comparing the acquired image to the reference image; and determining the device is in the closed state based on the comparison of the acquired image to the reference image.

18. The method of claim 17, wherein driving the plurality of transmitter electrodes with the sensing signals comprises driving the plurality of transmitter electrodes with transcapacitive sensing signals.

19. The method of claim 17, further comprising: determining the device is in an opened state.

20. The method of claim 17, further comprising: performing forced relaxation by reestablishing a baseline.

* * * * *